United States Patent [19]

Widmer et al.

[11] 4,038,523

[45] July 26, 1977

[54] RECEIPT VALIDATING BANK DEPOSITORY

[75] Inventors: John Robert Widmer, Hillsdale; Arthur John Gloeckler, Cresskill, both of N.J.

[73] Assignee: Widmer Time Recorder Co., Inc., New York, N.Y.

[21] Appl. No.: 692,881

[22] Filed: June 4, 1976

[51] Int. Cl.[2] ........................ G06K 15/02; B41K 45/00

[52] U.S. Cl. .................................. 235/61.9 R; 101/71

[58] Field of Search ..................... 235/61.7 R, 61.7 B, 235/61.9 R; 340/149 R, 149 A, 147; 194/4 R, 4 C, 4 E; 101/71

[56] References Cited

U.S. PATENT DOCUMENTS

| | | | |
|---|---|---|---|
| 2,030,313 | 2/1936 | Murtaugh, Jr. | 101/71 |
| 2,169,322 | 8/1939 | Keane et al. | 101/71 |
| 3,104,314 | 9/1963 | Simjian | 235/61.9 R |
| 3,778,596 | 12/1973 | Wapner | 235/61.9 R |
| 3,909,595 | 9/1975 | Morello et al. | 235/61.7 B |
| 3,973,237 | 8/1976 | Sawaguchi et al. | 235/61.7 B |

*Primary Examiner*—Daryl W. Cook
*Attorney, Agent, or Firm*—Darby & Darby

[57] ABSTRACT

A bank depository which provides a depositor with a validated receipt ticket evidencing that a deposit has been made, employs an envelope, in which the deposit is placed prior to insertion in the depository, having an unvalidated receipt ticket removably affixed to it. An outer surface of the depository has an opening through which the deposit is made leading to an internal chamber for storage of deposits and a slotted rotatable cylinder disposed between the opening and chamber normally positioned to prevent a deposit from being made until the receipt ticket is placed within a validator by the depositor. The cylinder then rotates to align its slot with the chamber to receive the deposit and allow it to pass through the chamber. Means are provided to sense the passage of the deposit to the chamber and to cause the receipt ticket to be validated in response thereto.

9 Claims, 9 Drawing Figures

RECEIPT VALIDATING BANK DEPOSITORY

BACKGROUND OF THE INVENTION

It is known in the banking field to provide mechanical depositories to accept deposits from bank customers without the need for a bank employee to receive the deposit. Customers are reluctant to use mechanical depositories which provide them with no evidence of having made a deposit to be used in the event their deposit is not credited to their account. Depositories have therefore been devised which automatically render a validated receipt, following a deposit by a customer, evidencing that a deposit has been made.

The receipt rendering depositories of the prior art generally have stored within them unvalidated receipt tickets in a stack or serial roll which tickets are validated and dispensed to the depositor in response to the entry of a deposit in the depository. Storage of unvalidated receipt tickets within the depository has several shortcomings. Complex mechanism must be provided for advancing the receipt tickets, after validation, through the depository and dispensing them to the depositor. Such machinery is expensive and prone to jamming and other mechanical failure. Determining when the supply of receipt tickets must be replenished prior to exhaustion of the supply is difficult. Loading of the depository with receipt tickets requires trained personnel. The depositor, due to his lack of access to the receipt ticket prior to making the deposit is unable to enter on the receipt ticket information concerning the nature and amount of his deposit as it is entered on the deposit slip which accompanies the deposit.

Other apparatus is known in the prior art in which a deposit receipt ticket is an integral part of a specially constructed deposit envelope wherein the information entered on a deposit envelope is simultaneously imprinted on the receipt ticket. After the deposit envelope is inserted into the depository the deposit receipt ticket is separated from the envelope and returned to the depositor. The mechanisms for such devices for separating the receipt from the deposit envelope and returning it are extremely complex and expensive and also prone to jamming and other mechanical failure. Specially constructed envelopes required for use with such depositories are substantially more expensive than conventional envelopes.

Depositories which allow the depositor to insert an unvalidated deposit ticket into the depository for validation and then withdraw it have the advantage of eliminating the need for complex machinery to dispense a validated receipt but have other shortcomings. A depository in which the validating mechanism validates a deposit ticket merely upon insertion of the ticket by the depositor therein provides no assurance that a deposit has actually been made since the depositor is given a validated deposit receipt irrespective of whether a deposit has actually been made. It is known in the prior art to provide sensing means which cause a receipt to be validated only upon the passage of a deposit through a passageway into a chamber in which the deposit is irretrievably stored. However, depositors, either unfamilar with such devices or forgetting to follow the proper steps in making a deposit are likely to enter the deposit into the depository prior to inserting a receipt ticket for validation in which case the validator will actuate while empty leaving the depositor with no evidence of having made a deposit.

SUMMARY OF THE INVENTION:

The present invention eliminates the need for complex receipt dispensing mechanisms in bank depositories and permits the depositor to insert a receipt ticket for validation while insuring that the receipt is not validated unless a deposit is actually made and that the deposit cannot be made before a receipt ticket is inserted in the validator. Specifically the invention provides for an automatic depository having a slotted rotary cylinder through which an envelope containing a customer's banking deposit is dropped into a vault or storage chamber. A stamping machine validator is provided which concurrently with the making of the deposit imprints the time and date of the deposit upon a receipt ticket previously inserted in the validator by the depositor. The rotary cylinder rotates to a position where its slot is aligned on one side with an adjacent slot in an outer surface of the depository housing and on the other side with a chute leading to the depository storage chamber or vault only in response to the insertion of a receipt ticket into the validating machine. In the chute which extends from the cylinder to the vault chamber there is disposed the actuating arm of a microswitch which arm is deflected as the deposit falls through the chute into the vault. The validating machine is actuated to stamp the receipt ticket only when the fall deposit trips the microswitch. The rotary cylinder is normally positioned with its slot out of alignment with the deposit slot in the depository housing to prevent entry of a deposit without prior insertion of a receipt ticket in the validating machine.

It is therefore an object of the invention to provide a bank depository wherein the depositor may insert a receipt ticket for validation and withdraw it after validation.

Another object of the invention is to provide a bank depository wherein a deposit cannot be made until a receipt ticket is first inserted into a validating machine.

Still another object of the invention is to provide a bank depository wherein a receipt ticket will not be validated unless a deposit is irretrievably made in the bank depository.

Other and further objects of the invention will be apparent from the following drawings and description of a preferred embodiment in which like reference numerals are used to indicate like parts in the various views.

DESCRIPTION OF THE DRAWINGS:

FIG. 7 is a fragmented side sectional elevation showing the rotary cylinder of FIG. 6 is an alternate position;

Figure 1:
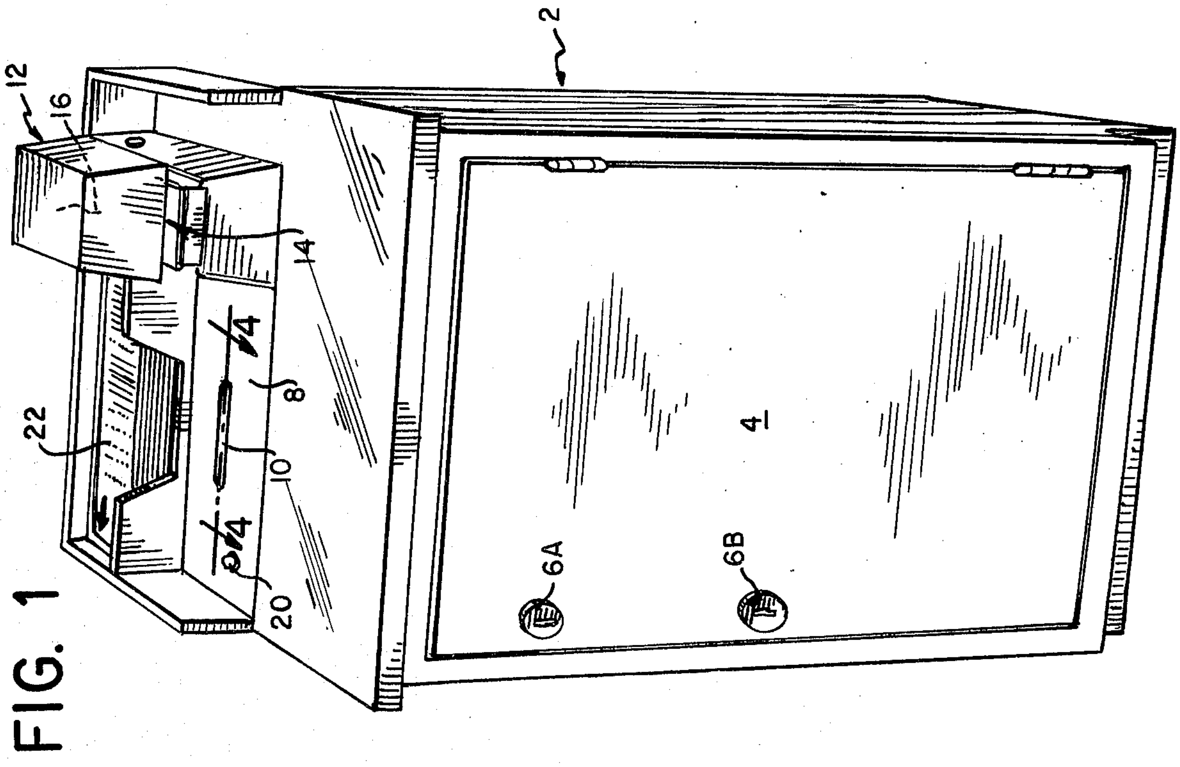
FIG. 1 is a perspective view of a bank depository according to the preferred embodiment of the invention.

DESCRIPTION OF THE PREFERRED EMBODIMENT:

Referring now to FIG. 1, a gank depository generally comprises a housing 2 on which there is hinged a door 4 which controls access to a vault chamber in which deposits are to be stored. The door 4 is provided with separate locks 6A and 6B each requiring a separately coded key and each of which must be unlocked to open the door 4 for removal of deposits from the depository. Keys to the locks may be provided separately to two respective bank employees to insure that both employees are present when the vault is opened for tallying of the deposits as a means of preventing embezzlement.

Atop the housing 2 there is a countertop surface 8 having a slot 10 through which the deposit is made by the depositor passing the deposit envelope containing money to be deposited therethrough.

A validating machine 12 is provided atop the countertop surface 8. The validating machine 12 is similar to a conventional stamping machine and employs an electrically actuated solenoid 13 to cause an engraved stamping surface to impress an ink image upon a ticket inserted in the validating machine through an opening 14 provided therefor.

Within the validating machine there is provided a feeler arm 16 operatively connected to a sensing switch 18 for detecting the presence of the receipt ticket inserted into the validating machine 12. Unlike the sensing switches in conventional solenoid actuated stamping devices which actuate the stamping machine in response to the tripping of a feeler arm by the ticket to be stamped, the sensing switch 18 is electrically connected to control communication between the slot 10 and vault chamber as will subsequently be explained. The stamping mechanism of the validating machine 12 is connected to respond to actuation of a switch disposed within the housing 2 to sense passage of the deposit from the slot 10 into the vault chamber as will subsequently be described.

An indicator light 20 is provided on the countertop surface 8 to indicte, when on, that the depository is ready to receive a deposit, that is, that the slot 10 is in uninterrupted communication with the vault chamber and, when off, that the depository is unable to accept a deposit.

Figure 3:
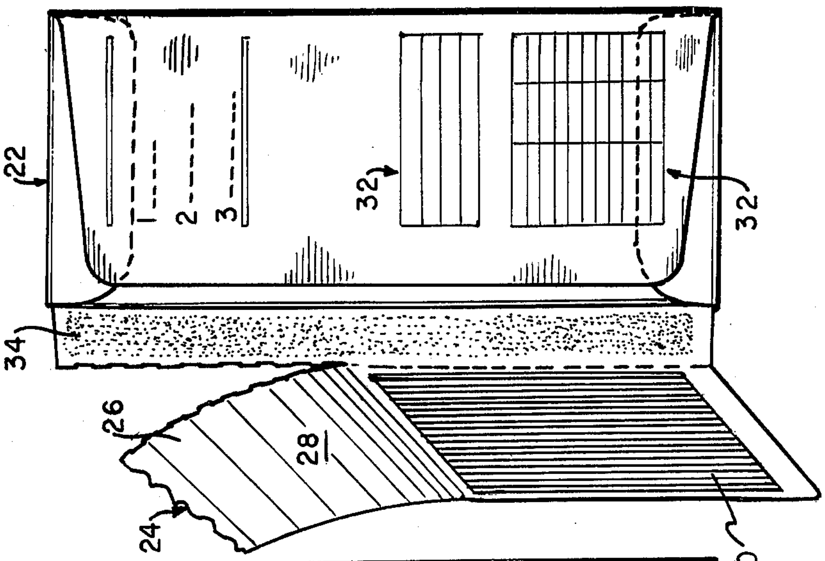
FIG. 3 is a deposit envelope as shown in FIG. 2 with the receipt ticket partially torn therefrom.
Figure 2:
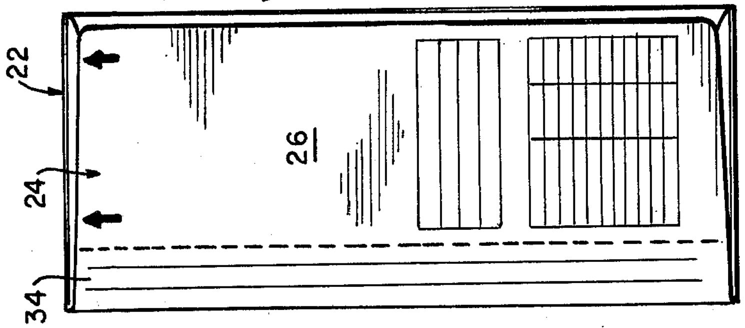
FIG. 2 is a deposit envelope with an unvalidated receipt ticket affixed to it for use with the bank depository of the preferred embodiment.

Rearward of the deposit slot 10 atop the countertop surface 8 there is provided a bin containing stacked prenumbered deposit envelopes. A deposit envelope used in accordance with the invention is illustrated in FIGS. 2 and 3. The deposit envelope 22 has a flap 24 which includes the deposit receipt ticket 26. The flap 24 is perforated along its length to permit removal by the depositor of the receipt ticket 26 after the receipt ticket is filled in in accordance with a preprinted format. The receipt ticket is preferably filled in before the deposit is placed in the envelope. The underside 28 of the receipt ticket 26 has an inked or carboned area 30 for reproducing the depositor's writing on the receipt ticket 26 in a corresponding preprinted area 32 on the outside of the deposit envelope 22. The remainder 34 of the flap 24 is coated with an adhesive for sealing the envelope 22 after the receipt ticket 26 is removed from the deposit envelope 22 and the contents of the deposit are placed in the envelope.

Referring now to FIGS. 4, 5, 6 and 7 there is provided immediately beneath the slot 10 in the countertop 8 a cylinder 38, having a diametric slot, from both ends of which cylinder there extend respective axles 40 and 42. The axles 40 and 42 are rotatably supported by conventional means in pillow bearings 36 bolted to the underside of the countertop 8 to permit rotation of the cylinder 38 about its axis. A flywheel 44 is fixedly mounted on the axle 40 for rotation therewith.

The flywheel 44 is part of a solenoid 46 which also includes a winding 48, an armature 50 and a connecting arm 52 rotatably mounted at one end to the armature 50 and at the other end to the outer face of the flywheel 44 adjacent its circumference. A coiled spring 54 is attached at one end to the underside of the counter 8 by hooking said one end of the coil spring to an aperture formed in a bolt 56 extending from beneath the countertop 8 and hooking the other end of the coiled spring 54 about a stud 58 on the connecting arm 52. The coiled spring 54 normally urges the connecting arm 52, and hence the armature 50, upward toward the counter 8. Thus, when the winding 48 is not energized the armature 50 is withdrawn from the winding 48 to a position where the armature engages an armature stop screw 60.

The armature stop screw 60 can be rotated to determine the withdrawn position of the armature when the winding 48 is not energized. The stop screw 60 is adjusted so that the pivot point 53 at which the connecting arm 52 is attached to the cylinder 38 occupies a position adjacent the counter 8 but out of diametric alignment with the point at which the arm 52 is mounted on the armature.

Figure 5:
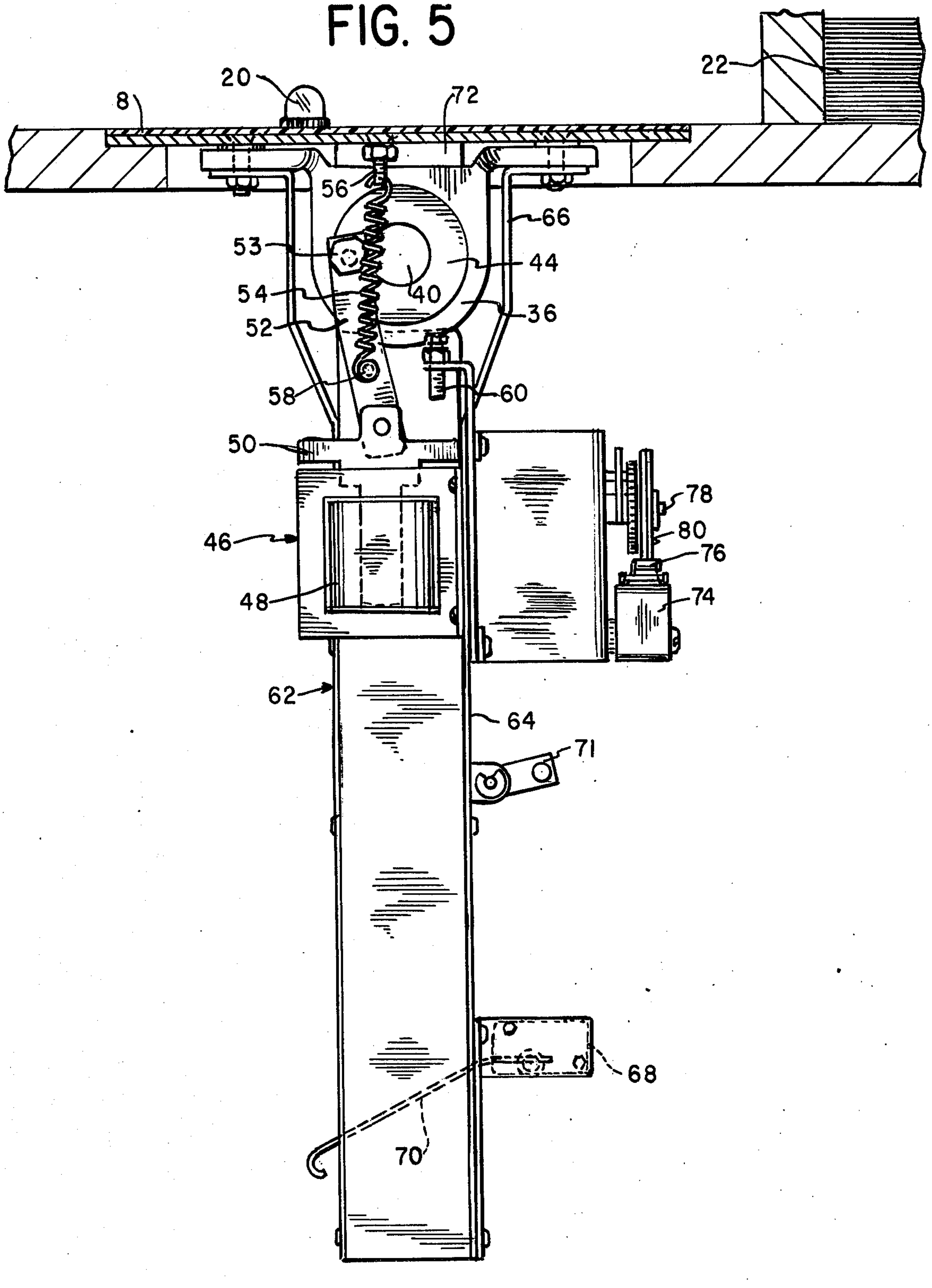
FIG. 5 is a side sectional elevation of the bank depository of the preferred embodiment taken through the line 5—5 of FIG. 4.
Figure 6:
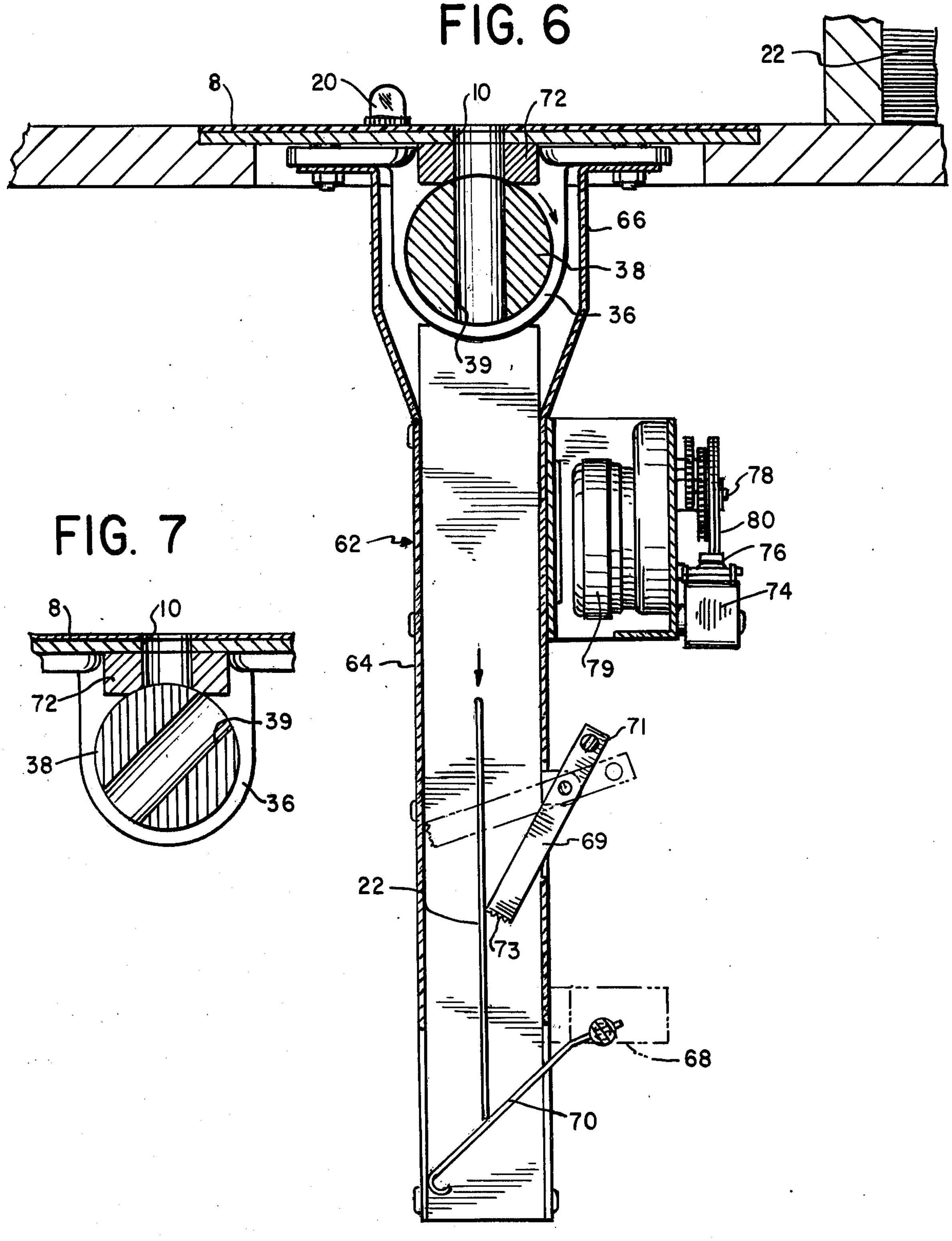
FIG. 6 is a side sectional elevation of the bank depository of the preferred embodiment taken through the line 6—6 of FIG. 4.

When the solenoid winding 48 is energized by causing an electric current to flow through it, the resulting magnetic field exerts an attractive force on the armature 50 causing it to move downward into the winding 48 overcoming the opposing force of the coiled spring 54. Downward movement of the armature 50 causes the connecting arm 52 to move downwardly with the armature 50 thereby rotating the flywheel 44 and cylinder 38 in a counterclockwise direction in the view of FIG. 5. When the armature 50 reaches its maximum downward position after energization of the winding 48 the position of the cylinder 38 is such that the slot 39 is in alignment with the slot 10 in the counter 8 as shown in FIG. 6 thereby permitting a deposit envelope 22 dropped through the slot 10 to fall through the slot 39 in the cylinder 38.

The cylinder 38 is solid and has a slot 39 passing completely through it and intersecting its axis. The clyinder 38 is positioned so that the slot 39 occupies a vertical position, transverse to the horizontal surface of the counter 8, when the solenoid 46 is energized as shown in FIG. 6. In the vertical position the slot 39 permits communication between the slot 10 in the counter 8 and a chute 62 leading to the deposit storage chamber.

The chute 62 is formed within a housing 64. The housing 64 is conventional and can be fabricated from sheet metal members. The housing 64 has a widened area 66 at its top in which the cylinder 38 is received and tapers into a narrower area defining the chute 62. The chute 62 and the slot 39 are of sufficient width to allow a deposit envelope 22 to pass through. The chute 62 projects into the upper region of the depository storage chamber so that an envelope 22 which passes through the chute 62 enters the chamber.

A microswitch 68 is mounted on the lower portion of one side of the housing 64. A lever arm 70 operatively connected to actuate the microswitch 68 upon downward movement of the lever switch normally projects into the chute 62 traversing substantially its entire depth so that an envelope 22 falling through the chute engages the lever arm 70. The width of the chute 62 is only slightly greater than that of the envelope 22 so that the lever arm 70 which is centered in the width of chute 62 cannot be avoided by the falling envelope 22. When a deposited envelope 22 engages the lever arm 70 the lever arm 70 yields to the weight of the envelope 22 pivoting downward and out of the path of the envelope 22 thereby permitting the envelope 22 to continue its travel through the chute 62 and into the storage chamber.

Figure 8:
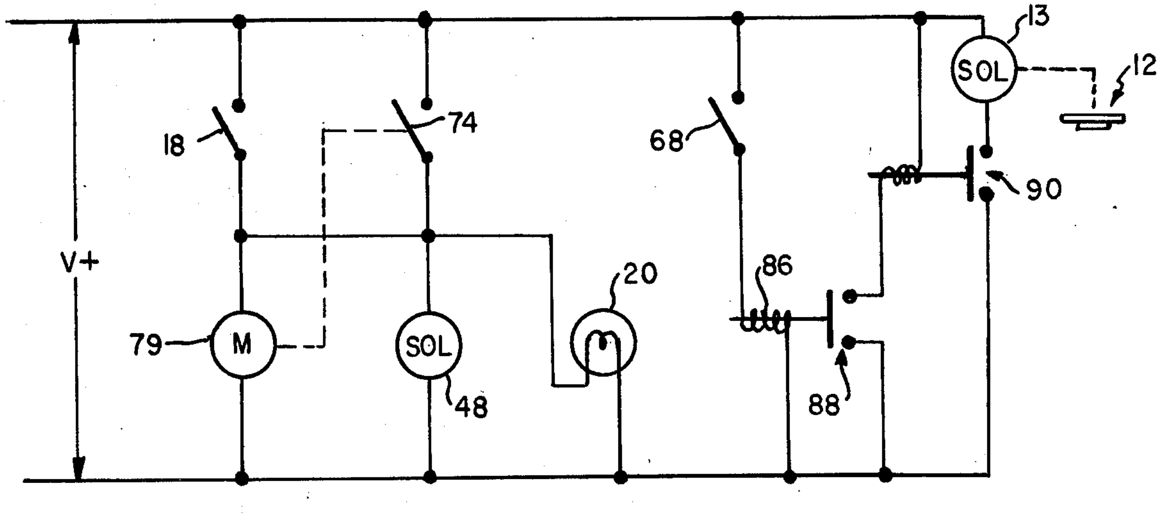
FIG. 8 is an electrical schematic diagram of the preferred embodiment of the invention.

Referring additionally to FIG. 8, a solenoid 13 in the validating machine 12 which is of the type conventionally used in validating machines for causing, when energized, a ticket to be stamped is connected to a voltage source through a normally open relay 90 which is operatively connected to the microswitch 68. Actuation of the feeler arm 70 by the falling envelope 22 closes the microswitch 68 thereby causing the relay 90 to close completing the circuit between the voltage source and validator solenoid 13 and causing the validator 12 to stamp a ticket previously inserted therein.

As the envelope 22 passes by the displaced feeler arm 70 and falls into the collection chamber the feeler arm 70 is urged upwardly back to its normal position again traversing the entire depth of the chute 62. In this manner the microswitch 68 is actuated each time an envelope 22 falls through the chute 62. The microswitch 68 and feeler arm 70 are attached to the housing 64 at a point sufficiently distant from the slot 10 in the counter 8 so that an envelope 22 cannot be retrieved by the depositor once it falls sufficiently to actuate the microswtich 68. To prevent retrieval of a deposit envelope dropped through the chute 62 there is provided a one-way gate 69. The gate 69 is pivotally mounted within the chute 62 above the microswitch 68 and traverses the entire depth of the chute 62. The gate 69 is provided at one end 71 with a counterweight to urge the other end of the gate 73, which can be provided with serrations, upward into contact with the adjacent wall of the chute 62. The counterweight at 71 is light enough to permit the gate 69 to be deflected downward and out of the way of a deposit envelope falling upon it and heavy enough to return the gate 69, once the envelope passes by it to its position obstructing the chute 62. The serrations prevent an envelope to which a string is attached from being pulled back up between the gate 69 and the adjacent wall of the chute 62, once the envelope is dropped through the chute 62.

The winding 48 of the solenoid 46 is connected to the voltage source through the sensing switch 18 which is in turn operatively connected to the feeler arm 16. The sensing switch 18 is normally open with the winding 48 deenergized and the spring 54 urging the connecting arm 52 upward so that the cylinder 38 has its slot 39 out of alignment with the slot 10 in the countertop 8. Due to the close fit between the rotary cylinder 38 and an enclosure 72 circumscribing the slot 10 and extending beneath the counter 8 a deposit cannot be passed through the slot 10 unless the cylinder 38 is rotated with its slot 39 in alignment with the slot 10. A depositor is therefore forced to insert a deposit ticket in the validator to cause the cylinder 38 to rotate so that its slot 39 is in alignment with the slot 10 in the counter 8 and the chute 62 before making a deposit. The deposit envelope 22 may then be dropped through the slot 10 and it will fall through the slot 39 and chute 62 into the collection chamber. The falling deposit envelope actuates the microswitch 68 as it passes through the chute 62 thereby causing the receipt ticket inserted in the validator 12 to be stamped.

After the deposit transaction is completed it is desired to have the rotary cylinder 38 return to its normal position with its slot 39 out of alignment with the slot 10 in the counter 8. This is accomplished by de-energizing the winding 48 thereby interrupting the magnetic field holding the armature 50 within the winding so that the force of the spring 54 pulls the armature 50 upward thereby rotating the cylinder 38 in a clockwise direction as shown in FIG. 5 to a position with slot 39 out of alignment with slot 10 as shown in FIG. 7. In this manner the depository is initialized for a succeeding transaction. Return of the cylinder 38 to its normal position upon completion of a deposit transaction may be accomplished by removal of the receipt ticket, in which case the sensing switch 18 is selected to remain closed while the ticket is in the validator and to open upon its removal, or by employing a timer to sense only the momentary closing of the sensing switch 18 and to maintain current flow to the solenoid 48 until a predetermined time thereafter and then interrupt the current flow or by operatively connecting the winding 48 of the solenoid of the microswitch 68 so that tripping of the microswitch 68, in addition to causing the validator to stamp the receipt ticket 26, also opens the circuit between the armature winding 48 and the voltage source.

It is possible that an individual may place a receipt ticket in the validator 12 and then leave the bank without making a deposit in which case the rotary cylinder 38 could remain in a deposit receiving position in alignment with the slot 10 in the counter 8. An unsuspecting might then unwittingly drop a deposit envelope 22 through the slot 10 without inserting the receipt ticket bearing the information on the deposit envelope. The deposit would be accepted by the machine leaving the depositor with the receipt ticket from his envelope unvalidated. To preclude this possibility, the invention can employ a timer which causes the rotary cylinder 38 to return to its normal position with its slot 39 out of alignment with the slot 10 as shown in FIG. 7 a predetermined time after the solenoid 46 is actuated for placing the rotary cylinder 38 in a deposit receiving position as shown in FIG. 6. A time of about 5½ seconds for maintaining the cylinder 38 in a deposit receiving position from the time the receipt ticket is inserted in the validator 12 has been found ample to permit the depositor sufficient time to make a deposit while insuring that the depository is initialized prior to use by a subsequent depositor.

Figure 4:
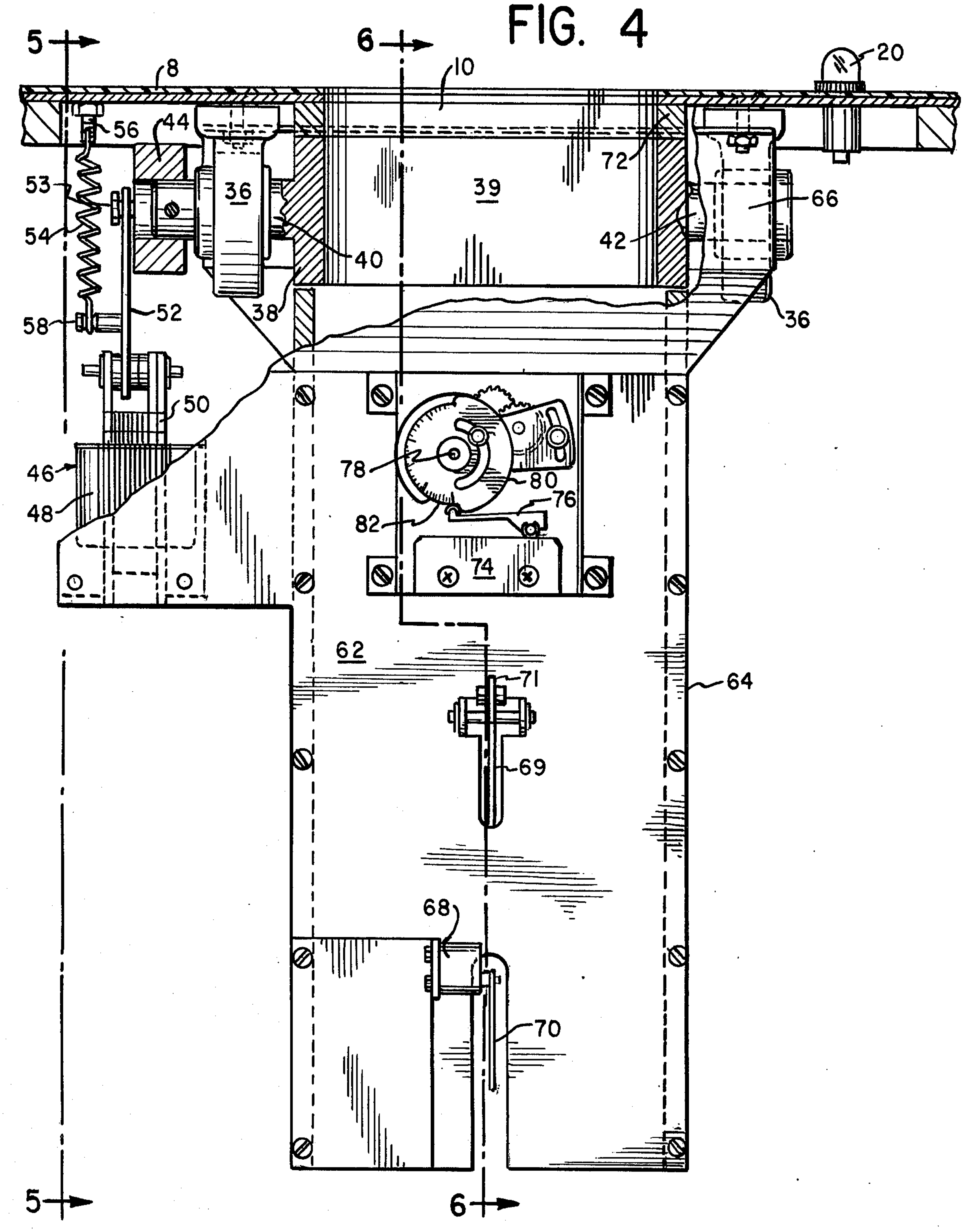
FIG. 4 is a sectional front elevation of the bank depository of the preferred embodiment taken through line 4—4 of FIG. 1.

Referring to FIG. 4, a timing mechanism suitable for limiting the period of time of each deposit transaction during which the depository can accept a deposit is shown. A microswitch 74 mounted on the outside of the housing 64 has a lever arm 76 normally biased toward with the microswitch 75 open. The microswitch 74 is operatively connected between the winding 48 of the solenoid 46 and the voltage source which energizes the solenoid 46. Mounted on the shaft 78 of the constant speed motor 79 is a cam 80 which rotates at constant speed with the shaft 78 of the motor 79 when the motor 79 is energized. The cam 80 is circular except for an indentation or dimple on its circumference as at 82 which is of lesser radius than the circular majority of the cam circumference. The timing motor is operatively connected to the voltage source through the sensing switch 18 so that when a receipt ticket is inserted in the validator 12 the timing motor is energized causing the cam 80 to rotate at constant speed. A roller on the end of the lever arm 76 rotates over the moving circumference of the rotating cam 80 with the lever arm 76 urged downward when the roller is in engagement with the larger circular circumference of the cam 80. The downward movement of the lever arm 76 causes the switch 74 to close thereby energizing the solenoid 46 and hence causing the cylinder 38 to rotate for alignment of its slot 39 with the slot 10 in the counter 8 as shown in FIG. 6 and to maintain that position until the cam rotates sufficiently so that the roller of the lever arm 76 again engages the dimple portion of the cam 80 permitting the lever arm 76 to be urged upward thereby opening the microswitch 74. Opening of the microswitch 74 deenergizes the winding 48 of the armature 46 thereby causing the rotary drum 38 to return to its position obstructing the slot and thereby preventing deposits from being made.

The dimple portion of the cam 80 subtends a radial angle large enough to allow for rotation of the cam 80, without closing the microswitch 74 again after opening of the switch 74, due to the inertia of the timing motor. The radial angle subtended by the dimple portion can be made adjustable by use of the cam arrangement shown in FIG. 6. An adjustable cam employs two partially circular members rotatably mounted with respect to one another on the shaft 78 of the timing motor. One of the cam members can be provided with an arcuate slot while the other is apertured to receive a threaded screw which passes through the arcuate slot. When the screw is loosened the two cam members may be rotated with respect to one another to determine the angle subtended by the dimple, that is the width of the dimple. The screw is then tightened to maintain the cam members in fixed alignment with respect to one another.

The timing cam may have one dimple as shown in the drawings or more than one dimple in which case each is equally spaced from the others about the circumference of the cam. The time during which the cylinder 38 is in position for receiving a deposit is determined by the time required for the dimple or indenture of the cam 80 to rotate past the roller on the lever arm 76 until it, or a next dimple indenture where multiple dimples are used, is engaged by the roller of the feeler arm 76. Where one dimple is used, the cycle time is substantially equal to the time for one complete revolution of the cam 80. Where multiple dimples are used the time of rotation from one dimple to the next determines the cycle time.

As previously indicated the cycle time is a function of the speed of rotation of the cam 80. The cam 80 is linked to the timer motor by a gear arrangement which may be selected to give the desired cycle time. The preferred embodiment uses a synchronous timer motor with gearing chosen for a $5\frac{1}{2}$ second cycle time. The cycle time may be modified by altering the gears linking the timer motor and cam 80 to increase or decrease the maximum time allowable for a deposit transaction as desired.

The light 20 can be operatively connected to the voltage source switches used to energize the solenoid 46, that is the sensing switch 18 and timer switch 74. Thus, when the solenoid 46 is energized to move the cylinder 38 to its deposit receiving position the light 20 is lit and remains lit until current to the winding 48 is interrupted at which time the rotary cylinder 38 returns to its obstructing position. The indicator light thus serves to advise that the rotary cylinder 38 is in a deposit receiving position when the light 20 is lit.

The opertion of the circuit of FIG. 8 including the timer will now be descried in detail. The operating voltage is applied across the sensing switch 18 in series with the parallel combination of the timing motor 79, the winding 48 of the solenoid and the lamp 20. As previously stated, the cam 80 driven by the motor 79 is operatively connected to the lever arm 76 of the microswitch 74.

When the receipt ticket is inserted in the validator the sensing switch 18 is momentarily closed actuating the timer motor 79, the solenoid winding 48 and the lamp 20. As the cam 80 begins to rotate in response to actuation of the motor 79 the switch 74 closes so that when the sensing switch 18 reopens current flow to the solenoid 48 and lamp 20 as well as to the timer motor 79 is not interrupted. Energization of the solenoid winding 48 causes the cylinder to rotate to its open position and remain there while the timer motor 79 continues rotating with the switdh 74 closed.

With the drum in its open position the depositor may insert the deposit envelope therein. As the deposit falls through the chute 62 with the trips the lever arm 70 of the microswitch 68 momentarily closing the microswitch 68. Closure of the microswitch 68 allows the voltage from the voltage source to be impressed across the winding of an electromagnetic 86 which causes a magnetically responsive switch 88 to close. Closure of the switch 88 in turn energizes the winding of the relay 90 the contacts of which are in series with the winding of the stamping solenoid 13. Thus when the relay 90 closes the power supply voltage is impressed across the stamping solenoid 13 causing it to stamp the receipt ticket.

The predescribed sequence of events must be completed before the cam 80 of the timer motor causes the switch 74 to open. When the indentation on the cam is reached and the switch 74 is permitted to open circuit flow to the timer motor 79, solenoid 48, and lamp 20 is interrupted. The timer motor then ceases to turn leaving the microswitch 74 open and the solenoid 48 de-energized allowing the cylinder 38 to be returned by the force of the spring 54 to its closed position. The indicator light 20 turns off indicating to the user that the depository is no longer in use and is available for the next depositor.

Figure 9:
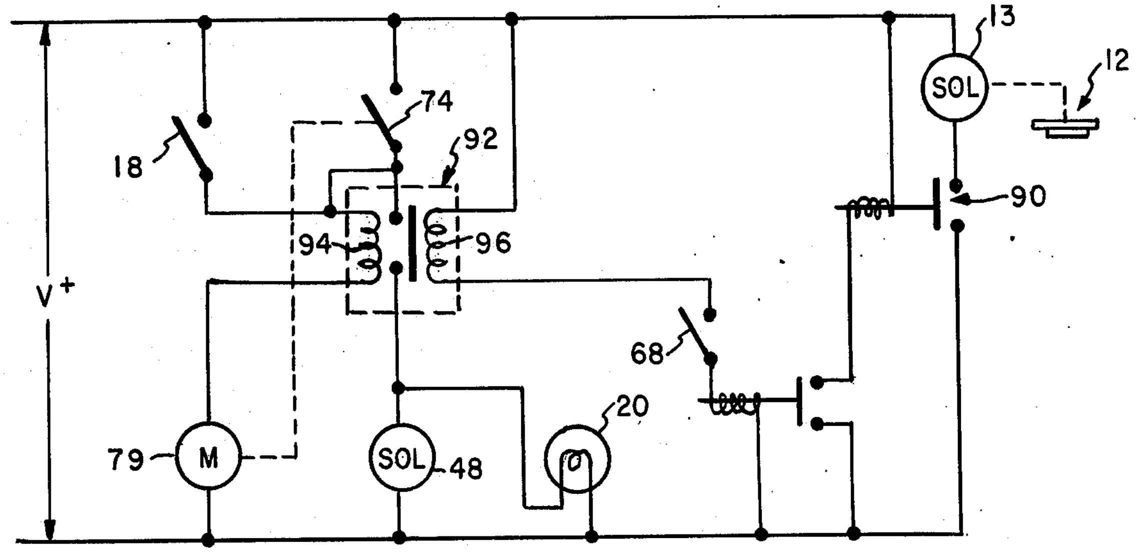
FIG. 9 is a modified electrical schematic diagram of the preferred embodiment of the invention.

To guard against the possibility of a subsequent depositor ignoring the indicator light and making a deposit before the timer completes its $5\frac{1}{2}$ seconds sequence it is desirable to cause the cylinder 38 to rotate to its closed position immediately after each deposit is made without waiting for the timer to complete its cycle. FIG. 9 shows a circuit similar to that of FIG. 8, but modified to cause the cylinder 38 to rotate to its closed position immediately upon actuation of the chute switch 68. In FIG. 9 a latching relay 92 is provided. The latching relay has a winding 94 in series with the timer motor 79 and another wnding 96 in series with the cylinder solenoid winding 48. An electrical pulse applied to the winding 94 causes the latching relay 92 to close and latch in the closed position until a pulse is applied to the winding 96 at which time the relay 92 opens and latches in the open position. Magnetic latching circuits of this type will be know to those familar with the art. In the closed position, the latching relay 92 connects the solenoid winding 48 to switches 18 and 74.

When the receipt ticket is inserted in the validator the sensing switch 18 is momentarily closed starting the timer motor to close the switch 74 and energizing the winding 94 thereby closing the latching relay 92. Closing of the latching relay 92 in turn energizes the solenoid winding 48 and the lamp 20 causing the cylinder 38 to rotate to its open position. When a deposit is made and the chute switch 68 is tripped the operating voltage is applied to the winding 96 causing the latching relay 92 to open thereby interrupting the flow of current to the solenoid winding 48. As a result the cylinder rotates to its open position immediately following the passage of the deposit envelope through the chute 62. Actuation of the stamping solenoid is accomplished as explained with reference to FIG. 8. The cylinder 38 remains closed while the timer completes its sequence at which time the switch 74 is opened and the depository is ready to receive a subsequent deposit. The switch 74 remains closed while the timer completes its cycle so that momentary actuation of the switch 18 by a subsequent deposit ticket causes no change in voltage across the winding 94 and hence insertion of a receipt ticket into the validator before the timing cycle is completed has no affect on the cylinder solenoid 48.

It will be appreciated that the apparatus of the instant invention insures that the deposit receipt is not validated unless a deposit is actually made and further insures that no deposit may be made without a receipt ticket first being placed in a validator to be stamped upon entry of the deposit in the depository. It is to be further noted that the foregoing is a description of a preferred embodiment of the invention which may be practiced by means other than those specifically set forth in the description of the preferred embodiment. For example, the microswitch 68 in the chute 62 may be replaced by an optical sensor including a lightbeam directed across the chute 62 and a light sensor opposite the lightbeam whereby the lightbeam is interrupted by a falling deposit envelope to actuate a switch means which controls the validator mechanism. The timing mechanism heretofore described may be replaced by other timing means, as for example, of the electronic analog type wherein the time to charge an R.C. circuit is utilized in limiting the time during which the depository is able to accept deposits or a digital type wherein the time for a digital counter to count a predetermined number of pulses is employed. Other variations are possible without departing from the invention which is limited only by the following claims.

What is claimed is:

1. A receipt validating depository wherein a receipt ticket inserted by a depositor is validated only when a deposit is made and wherein no deposit may be made unless the depositor first inserts a deposit ticket for validation comprising:

means for validating a receipt ticket placed therein, first sensing means for sensing the placment of said receipt ticket in said validating means, a housing having a chamber in which said deposit is to be stored, said housing having an access way leading to said chamber through which the deposit can be made, second sensing means for sensing the passage of the deposit through the access way to the chamber, said validating means being responsive to said second sensing means for validating said deposit ticket only when a deposit is made, means normally obstructing said access way, said obstructing means being responsive to said first sensing means for permitting communication between said access way and said chamber only after said receipt ticket is inserted in said validating means, and switching means operatively connected to said obstructing means, said obstructing means being returned to its normal position obstructing said access way to prevent communication with said chamber in response to actuation of said switching means.

2. Apparatus according to claim 1 wherein said switching means is responsive to said first sensing means for actuating after said receipt ticket is removed from said validating means.

3. Apparatus according to claim 1 further comprising, timing means responsive to said first sensing means, said switching means being responsive to said timing means for actuating a predetermined time after said receipt ticket is inserted in said validating means.

4. Apparatus according to claim 1 wherein said switching means is responsive to said second sensing means for actuating after the deposit is made.

5. Apparatus according to claim 1 wherein said access way comprises a surface on said housing having a first opening, and said obstructing means comprises a cylinder rotatably mounted in said housing and having a second opening permitting a deposit to pass through said cylinder when said second opening is in alignment with said first opening, and means for rotating said cylinder for aligning said second opening with said first opening when said access way is to be in communication with said chamber and for placing said second opening out of alignment with said first opening when said access way is to be obstructed to prevent communication with said chamber.

6. Apparatus for accepting a banking deposit and providing the depositor with a validated receipt ticket evidencing that the deposit has been made comprising:

a depository having an internal chamber for storage of deposits and an external opening communicating with said chamber, said deposit traversing a path from said opening to said chamber when a deposit is made, barrier means movable between a first position impeding the passage of said deposit envelope from said opening to said chamber and a second position permitting the passage of said envelope from said opening to said chamber, said barrier means normally occupying said first position, means for validating said receipt ticket including first sensing means for sensing the placement of said receipt ticket in said validating means, means for moving said barrier means between said first and second positions, second sensing means disposed in said path for sensing the passage of said deposit envelope therethrough, said valadiating means being responsive to said second sensing means for validating said receipt ticket only when said deposit envelope traverses said path, and switch means actuable between first and second switching states said switch means being responsive to said first sensing means for occupying said second state when said ticket is placed in said validating means, said moving means being responsive to said switching means for causing said barrier means to occupy said second position when said switch means is in the said second state and for causing said barrier means to return to said first position when said switch means is returned to said first state.

7. Apparatus according to claim 6 wherein said switch means is responsive to said second sensing means for returning to said first state after the deposit is made.

8. Apparatus according to claim 6 wherein said switch means comprises timing means responsive to said first sensing means, said switch means occupying said second state for a predetermined time following placement of said ticket in said validating means and returning to said first state thereafter.

9. Apparatus according to claim 8 wherein said switch means further comprises latching means responsive to said first sensing means for maintaining said switch means in said second state in response to placement of the receipt ticket in said validating means and responsive to said second sensing means for returning said switch means to said first state and maintaining said switching means in said first immediately following the making of a deposit irrespective of whether said predetermined time has elapsed

* * * * *